United States Patent
Peeters et al.

(10) Patent No.: US 6,405,517 B1
(45) Date of Patent: Jun. 18, 2002

(54) FOLDING WHEEL RAKE WITH IMPROVED FOLDING MECHANISM

(75) Inventors: Kenneth J. Peeters, Bear Creek; Gregory L. Landon, Shawano, both of WI (US)

(73) Assignee: H&S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 09/602,989

(22) Filed: Jun. 23, 2000

(51) Int. Cl.$^7$ ................................................ A01D 76/00
(52) U.S. Cl. ........................................ 56/377; 172/311
(58) Field of Search ................. 56/375, 376, 377–392; 172/311, 456, 458, 459, 662; 403/321; 111/52, 200

(56) References Cited

U.S. PATENT DOCUMENTS

| | | |
|---|---|---|
| 2,636,335 A | 4/1953 | Whitney |
| 2,658,324 A | 11/1953 | Johnson |
| 2,925,702 A | 2/1960 | Plant |

(List continued on next page.)

FOREIGN PATENT DOCUMENTS

| | | |
|---|---|---|
| NL | 6413167 | 5/1965 |

OTHER PUBLICATIONS

Tonutti Farm Machinery Industries, Operator's Manual and Part List—Carted Hayrake, No date.
Kelderman Manufacturing, Inc., KRC–III Rake Caddy one–page brochure, No date.
Rowse V–Rake, 2–page brochure, No date.
Kelderman Manufacturing, Inc., KSR16 & KSR20 Wheel Stretch Rakes 2–pages brochure, No date.
Enorossi, Harvestman "V" Rake, Hay Line Machines/Hay Line Machines 1–page brochure, No. date.
Enoagricola Rossi, "Harvestman" the new Enorossi "V" rake 2–page brochure, No date.
Sitrex Agricultural Machinery, H90 Carted Rake V 2–page brochure, No date.
Sitrex Agricultural Machinery, Mounted side–delivery rake, 4–page brochure, No date.

(List continued on next page.)

*Primary Examiner*—Robert E. Pezzuto
(74) *Attorney, Agent, or Firm*—Patterson, Thuente, Skaar & Christensen, P.A.

(57) ABSTRACT

An economical wheeled towable folding wheel rake of robust, largely welded construction utilizing a single hydraulic cylinder to fold two opposed wheel rake assemblies via a four bar linkage. The folding mechanism folds the opposed rake assemblies to a compact, symmetrical, easily locked, vertical orientation for shipping transit and storage. The folding mechanism is simple and utilizes few wearing pivots yet enables flotation of the opposed rake assemblies independent of one another and of the main frame of the wheel rake. The opposed wheel rake assemblies are independently adjustable in raking angle, raking width and raking down pressure.

12 Claims, 6 Drawing Sheets

U.S. PATENT DOCUMENTS

| | | | |
|---|---|---|---|
| 2,982,081 A | | 5/1961 | Cooley |
| 3,108,424 A | | 10/1963 | Van Der Lely |
| 3,221,484 A | | 12/1965 | Van Der Lely |
| 3,466,860 A | | 9/1969 | Winkel et al. |
| 3,967,684 A | * | 7/1976 | Haverdink .................. 172/311 |
| 3,977,166 A | | 8/1976 | Delgado |
| 4,077,189 A | | 3/1978 | Hering |
| 4,078,366 A | | 3/1978 | Carmichael |
| 4,183,198 A | | 1/1980 | Sligter |
| 4,214,428 A | | 7/1980 | Caraway |
| 4,231,218 A | | 11/1980 | Delgado |
| 4,245,458 A | | 1/1981 | Smith |
| 4,570,722 A | * | 2/1986 | Osborn ....................... 172/311 |
| 4,723,401 A | | 2/1988 | Webster et al. |
| 4,723,402 A | | 2/1988 | Webster et al. |
| 4,723,403 A | | 2/1988 | Webster |
| 4,753,063 A | | 6/1988 | Buck |
| 4,785,614 A | | 11/1988 | Schoenherr |
| 4,790,389 A | * | 12/1988 | Adee et al. ................. 172/776 |
| 4,840,233 A | * | 6/1989 | Friggstad et al. ........... 172/311 |
| 4,932,197 A | | 6/1990 | Allen |
| 4,947,631 A | | 8/1990 | Kuehn |
| 4,974,407 A | | 12/1990 | Rowe et al. |
| 4,977,734 A | | 12/1990 | Rowe et al. |
| 5,025,616 A | | 6/1991 | Moss |
| 5,062,260 A | | 11/1991 | Tonutti |
| 5,065,570 A | | 11/1991 | Kuehn |
| 5,177,945 A | | 1/1993 | Tonutti |
| 5,199,252 A | | 4/1993 | Peeters |
| 5,203,154 A | | 4/1993 | Lesher et al. |
| 5,231,829 A | | 8/1993 | Tonutti |
| 5,263,306 A | | 11/1993 | Tonutti |
| 5,305,590 A | | 4/1994 | Peeters |
| 5,313,772 A | | 5/1994 | Tonutti |
| 5,493,853 A | | 2/1996 | Tonutti |
| 5,540,040 A | | 7/1996 | Peeters |
| 5,598,691 A | | 2/1997 | Peeters |
| 5,615,545 A | | 4/1997 | Menichetti |
| 5,685,135 A | | 11/1997 | Menichetti |
| 5,740,870 A | * | 4/1998 | Rodgers et al. ............. 172/456 |
| 5,752,375 A | | 5/1998 | Tonutti |
| 5,899,055 A | | 5/1999 | Rowse et al. |
| 6,038,844 A | | 3/2000 | Peeters et al. |

OTHER PUBLICATIONS

Sitrex Agricultural Machinery, RP6 RP12 Mounted Side–Delivery Rake 2–page brochure, No date.

Kelderman Manufacturing, Inc., Kelderman Open Wheel Rakes 1–page brochure, No date.

Kalona Machine Shop, The Original V Rake on Wheels 1–page brochure, No date.

Tigerco Dist. Co., E–Z V–Rake Cart 1–page brochure, No date.

Vicon, Crop–driven fingerwheel rakes 6–page brochure, No date.

Vicon, High capacity rakes RH 600–720 3–page brochure, No date.

H&S Manufacturing Co. Inc., H&S Trailer Model "V"–Rake 2–page brochure, No date.

Sitrex Agricultural Machinery, Recommended Spare Parts List RP/6–RP/12, 2 pages, No date.

Sitrex Agricultural Machinery, 1–page rake brochure, No date.

Sitrex Agricultural Machinery, H94 V Rake Cart 1–page brochure, No date.

* cited by examiner

FOLDING WHEEL RAKE WITH IMPROVED FOLDING MECHANISM

FIELD OF THE INVENTION

The present invention relates to agricultural implements and, in particular, it relates to towable folding wheel rakes useful to form windrows from cut forage.

BACKGROUND OF THE INVENTION

A primary goal in the harvesting of hay is to dry the hay as soon as possible and remove it from direct exposure to sunlight. The hay must be dried before storage to avoid the problems of mold and spontaneous combustion. Exposing the cut hay to sunlight longer than is required to adequately dry it, however, can result in unacceptable loss of nutritive value of the hay due to deterioration of the protein level.

Typically, hay is harvested into approximately five-foot swaths along the ground, and is exposed to sunlight for the initial stage of the drying process. The swaths of hay are then raked into narrow windrows to remove most of the hay from direct contact with the moist ground. The windrow enhances air circulation within the hay, thereby hastening the drying process.

Many types of wheel rakes have existed for decades. These comprise angled, tined wheels that are propelled across the ground of a field of cut forage. Contact with the ground while traveling across the ground rotates the wheels and thereby rakes the hay in a desired direction. Of particular interest are V-rakes in which at least two banks of rake wheels are deployed in the shape of a V during operation. Generally, V-rakes employ an arm on each side of a frame to support the wheel rakes. Such V-rakes are used to rake forage into a swath or windrow by raking the forage from the outer edges of the implement inward. V-rakes are preferably adjustable so that the width of the windrow produced is variable and the swath raked on each pass is optimal for the circumstances encountered. For optimal operation, it is preferable to be able to independently adjust the angle of the wheel banks, and the width of their separation.

Wheel rakes are subject to repeated structural stresses due to uneven ground and irregular distribution of forage material when propelled through fields of cut hay to form the hay into windrows. The arm assemblies supporting the wheel rakes must have considerable strength in order to bear such stresses successfully. Welded assemblies are thus preferred for their robustness and durability.

Another consideration in wheel rake design is the ability of the rake to compensate for variations in the terrain that it passes over. The raking wheels must have some freedom to move up and down while maintaining a certain amount of downward pressure. This freedom of motion is referred to as flotation and the raking wheel assemblies are said to float to compensate for terrain unevenness. It is preferred that each bank of raking wheels be able to float independently of the other bank and that the raking wheels each have some freedom to float within the bank. Such independent flotation promotes efficient raking, and reduces the risk of operational damage to the equipment. It is further beneficial if the down pressure of the wheel rakes can be adjusted to adapt to varying conditions.

Aside from raking forage efficiently, wheel rakes must be readily transportable from storage to field and between fields. This generally involves passing through fence gates and transportation on public roadways. Since the wheel rake implement is configured to rake a wide swath in use, there must be provided a means to configure the rake more compactly for transport. A wide variety of schemes for accomplishing this have been disclosed in the prior art. Some involve folding the V-rake by raising the wheel supporting arms from a horizontal position used when raking a field to a vertical position for transit. This can be accomplished manually or with powered assist, commonly with hydraulics. Hydraulic folding provides for operator convenience as well as improved safety since the operator need not risk contact with the relatively heavy machinery while it is being folded. V-rakes that fold upward to allow for transport include those disclosed in U.S. Pat. Nos. 4,977,734, and 4,974,407 to Rowe et al., 4,753,063 to Buck, 4,214,428 to Caraway and 4,183,198 to Sligter.

Wheel rake implements must share the public right of way with automotive and pedestrian traffic. Safety concerns dictate that rake arms folded in a vertical position be securely held in their vertical orientation. Accordingly, many folding wheel rake designs include various safety lock devices, such as chains and locking collars to prevent the movement of the rake arms from a vertical position. Safety lock devices can require relatively complex intervention on the part of the operator to engage. Operation and engagement of safety locks should be as simple as possible, to encourage their routine use.

One of the significant costs involved in the production and delivery of hay rakes is that of shipping. Wheel rakes, however, are necessarily bulky in order to accomplish their intended task, and can present extraordinary challenges with regard to shipping. One approach to the challenge of shipping wheel rakes has been to design rakes to be assembled from many small sub-components. Such rakes are shipped disassembled, and can present a quite compact shipping package. This approach, however, creates a rake that is largely bolted together, and more prone to operational damage than a rake that is substantially welded in construction. Additionally, the implement dealer or end user must expend considerable labor to assemble the rake. Welded rakes, on the other hand, offer superior strength and durability but also comprise large individual rake components that do not lend themselves well to compact shipping packages. A V-wheel rake of substantially welded construction, that could be compactly configured for shipping and required minimal assembly upon arrival at its intended location, would provide distinct advantages.

Another factor affecting both the manufacturing and operating cost of hydraulically folded wheel rakes is the number of hydraulic components. Many folding rakes employ multiple hydraulic piston and cylinder assemblies to fold the rake arms. Efforts to reduce costs have lead to the development of linkages that allow a single piston and cylinder assembly to fold both arms. In order to raise the rake arms symmetrically, a variable geometry quadrilateral can be employed. A hydraulic piston and cylinder assembly forms the diagonal of a quadrilateral. When the piston and cylinder assembly is extended, the other diagonal of the quadrilateral is shortened to lift the rake arms. When the piston and cylinder assembly is retracted, the other diagonal is extended to lower the arms. In general, these linkages can be somewhat complex, heavy and often have multiple pivots which require frequent lubrication and tend to wear. U.S. Pat. Nos. 5,313,772 and 5,263,306 to Tonutti, assigned to Tonutti S. P. A., disclose examples of wheel rakes employing a single piston and cylinder assembly in conjunction with a quadrilateral linkage.

A single piston and cylinder assembly could be used to extend between and interconnect the lift arms directly.

Particularly if flotation is allowed at the interconnection points, however, a single piston and cylinder raising approach would tend to lift the arms unequally, with one arm being vertical and the other hanging to one side. This creates the appearance, if not necessarily a greater likelihood, that a rake arm may fall while the rake is in transit. It may create anxiety or concern that the rake arms are not entirely raised in the mind of the operator or motorists passing near the rake while it is in transit. It is preferable that rake arms be raised to a symmetrical vertical position.

It would be desirable to produce an economical, towable, folding V-rake, the folding mechanism of which is actuated by a single hydraulic piston and cylinder assembly, which folds the arms to a compact, symmetrical, easily locked, vertical orientation for shipping, transit and storage, without employing a complex linkage. It would be preferable for such a rake to allow for convenient independent adjustment of the angle and width of the raking assemblies and of the down pressure of the raking wheels. The rake would ideally be constructed largely of welded components, to provide a robust wheel rake requiring minimal assembly by the seller or end user.

SUMMARY OF THE INVENTION

The present invention in large measure solves the above noted problems, providing a folding rake with an improved folding mechanism. The rake hereof employs a single hydraulic piston and cylinder assembly to fold both arms of a V-rake by a simple, light weight mechanism providing for independent flotation, having relatively few wearing pivot points, and yet still raising the rake arm assemblies to secure vertical positions. Additionally, the V-rake hereof provides for independent adjustment of transport wheel width, rake angle, raking width and wheel down pressure. The towable V-wheel rake of the present invention is uniquely foldable for compact shipping and storage, without the necessity of significant disassembly.

The folding mechanism comprises a single hydraulic piston and cylinder assembly secured at one end to the rake frame or carriage. The hydraulic piston rod engages a tower on a first wheel rake assembly or subframe and rotates the first wheel rake assembly about a pivot point. A linkage assembly includes a bellcrank rotatable about the same first wheel rake assembly pivot point, with the bellcrank linked to a pushrod which is further linked to a second tower on the second wheel rake assembly or subframe. The bellcrank end of the pushrod and the tower end of the pushrod are configured to travel in unequal arcs while the wheel rake assemblies rotate in equal arcs, thereby enabling the arms of the wheel rake assemblies to be raised to a symmetrical vertical transport position, while still providing for flotation of the lift arms, independent of one another, when in the unfolded working position.

When the wheel rake assemblies are in the down, working position for raking, they are supported by adjustable tension compression springs, thus providing for variable down pressure and an independent adjustment of down pressure for each wheel rake assembly.

Each wheel rake assembly further includes a beam carrying a plurality of raking wheels. The beam is pivotably adjustable to vary the angle of the wheel bank carried by the beam relative to the direction of travel of the V-rake. This is accomplished by pivotably fixing one end of a rod to the rake arm and providing a series of connection points spaced upon the beam. The second end of the rod is selectively engageable by any of the connection points.

Additionally, the raking width may be varied independently for each side of the rake. Each rake arm comprises a slider that telescopes in and out relative to a fixed sleeve, and is selectively fixable at a plurality of different positions of width.

The rake frame is carried by ground engaging transport wheels. The wheels are independently adjustable long the width of the frame by clamping them at various locations upon the transverse bar of the wheel rake.

DETAILED DESCRIPTION OF THE INVENTION

Figure 1:
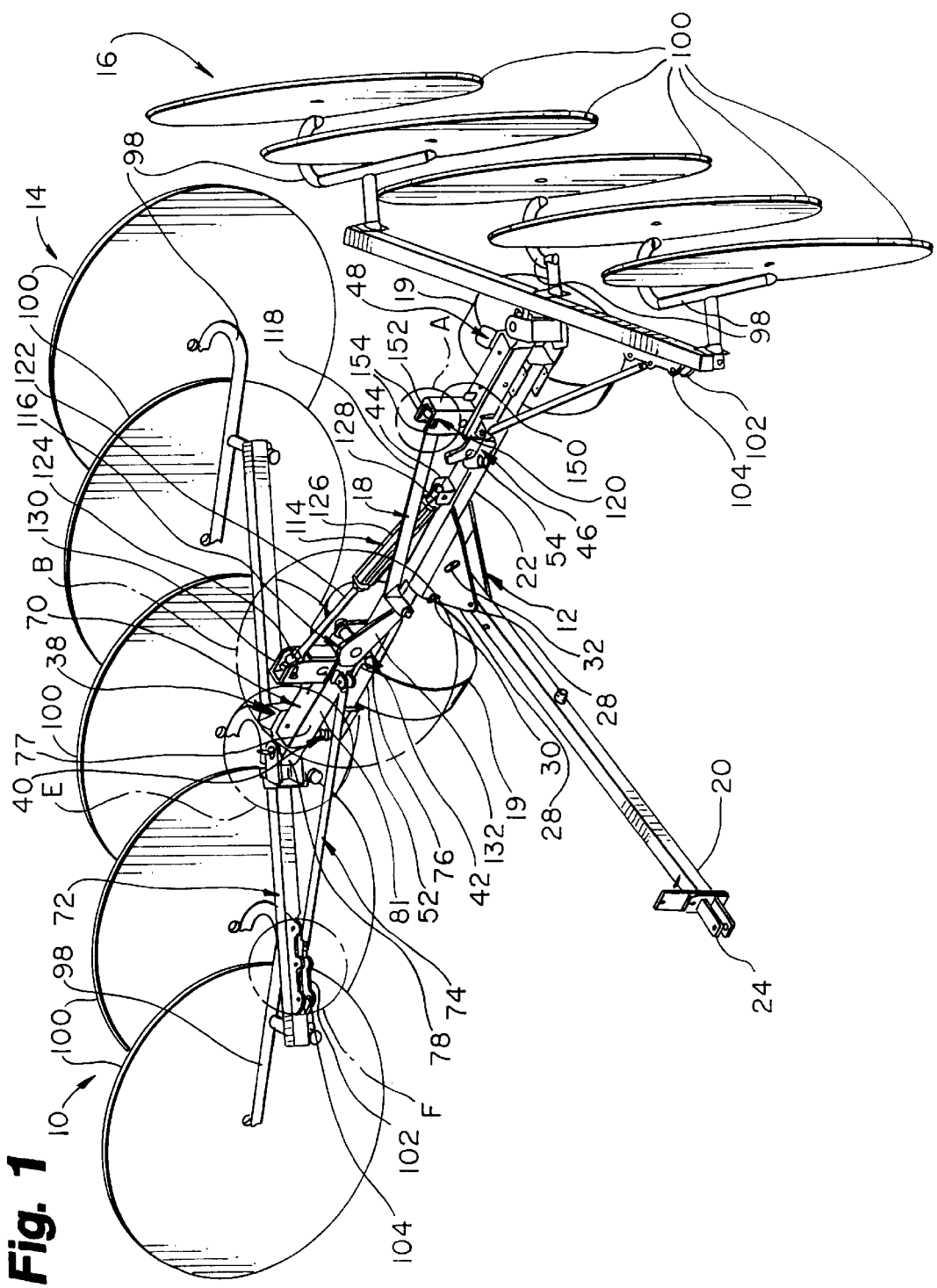
FIG. 1 is a front perspective view of a wheel rake in accordance with the present invention, with the arms of the rake in the horizontal raking position.
Figure 2:
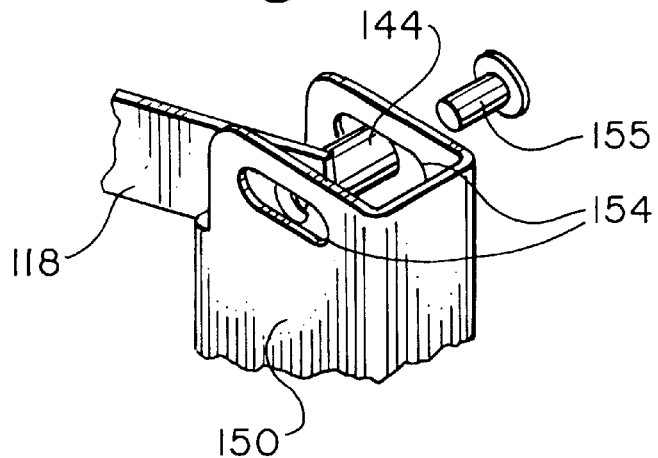
FIG. 2 depicts detail of area A from FIG. 1.
Figure 4:
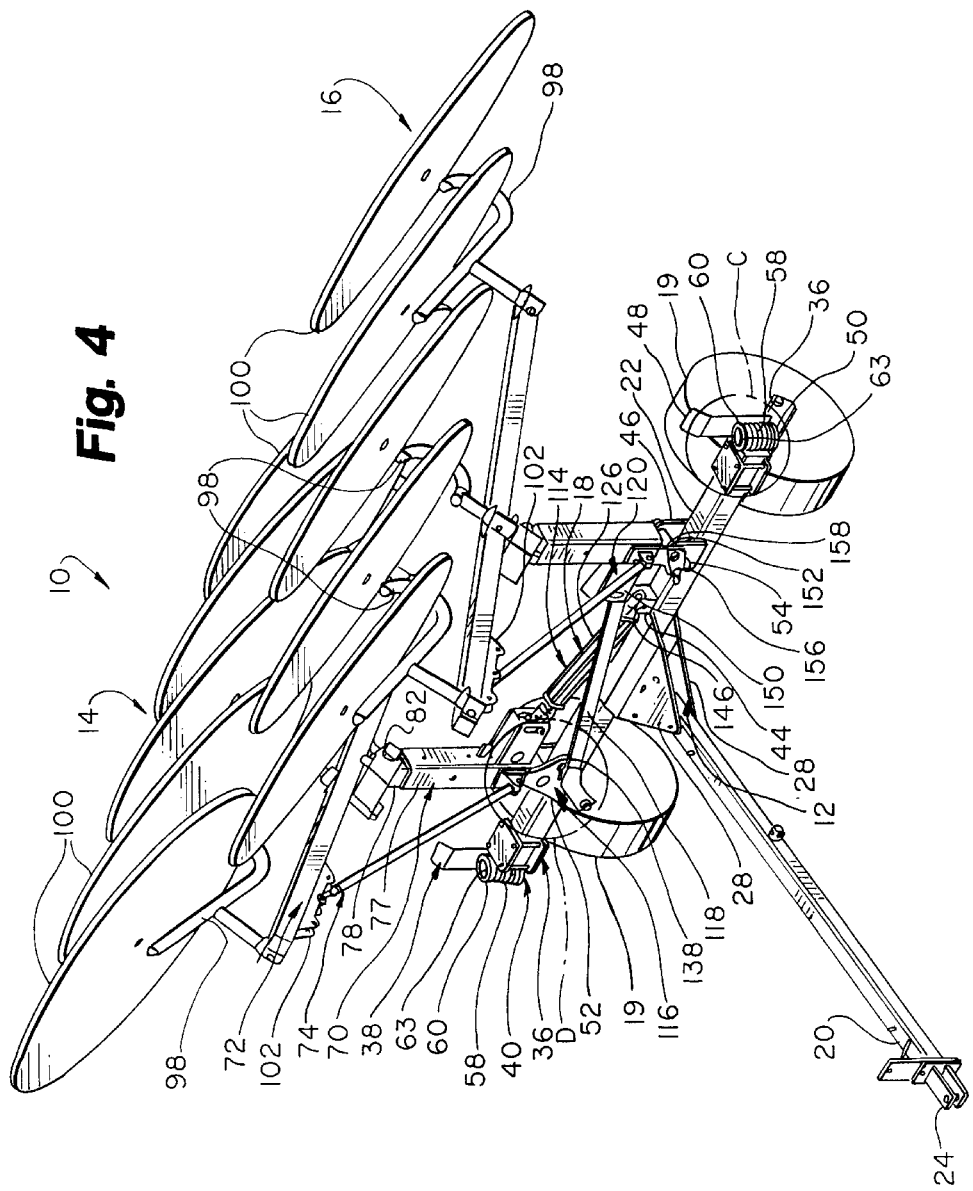
FIG. 4 is a front perspective view of the wheel rake with the arms in the vertical transport position.

Referring in particular to FIGS. 1 and 4, a folding wheel rake 10, in accordance with the present invention, generally includes a primary frame 12, a right wheel rake assembly 14, a left wheel rake assembly 16, a lift assembly 18, and ground engaging wheels 19.

The primary frame 12 generally includes a draw bar 20, at the front end thereof, and a transverse bar 22. The draw bar 20 includes, at its front end, a hitch 24 adapted for connection to a prime mover, preferably a tractor (not shown). The draw bar 20 is removably received within a channel formed by gussets 28, and is retained therein by bolts or other suitable fastening device. Retainer pins 30, 32 can be stowed in apertures placed in gussets 28.

Transverse bar 22 is supported by ground-engaging transport wheels 19. Wheel strut assemblies 36 are shiftably clamped to transverse bar 22 for support of wheels 19 along the transverse bar 22.

Figure 3:
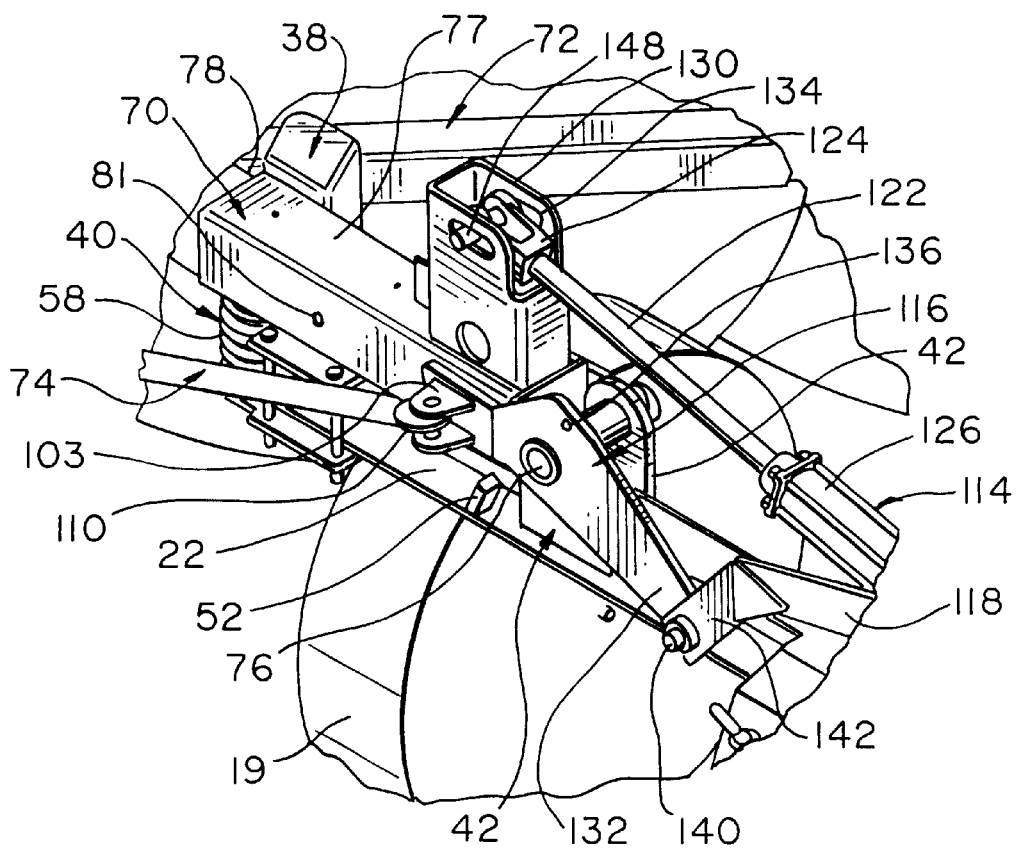
FIG. 3 depicts detail of area B from FIG. 1.
Figure 6:
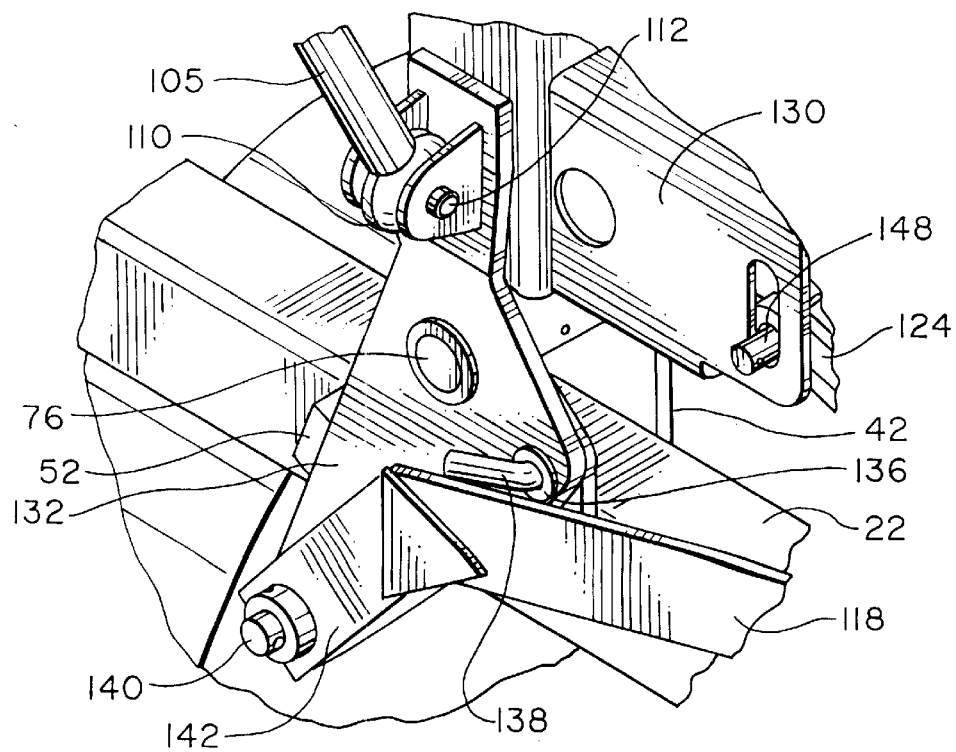
FIG. 6 depicts detail of area D from FIG. 4.

The right end of transverse bar 22 supports right wheel rake assembly retainer 38. Right wheel rake assembly retainer 38 includes right wheel rake assembly support spring mount 40. A right wheel rake assembly pivot mount 42 is carried by transverse bar 22 inboard of right wheel rake assembly retainer 38. A hydraulic piston and cylinder assembly pivot mount 44 is located in the center region of transverse bar 22. Referring to FIGS. 3, 4 and 6, right pivot stop 52 and left pivot stop 54 are carried by transverse bar 22. Left wheel rake assembly pivot mount 46, left wheel rake assembly retainer 48, and left wheel rake assembly spring mount 50 are mounted at the left end of transverse bar 22 in a mirror image to similar parts at the right side, and subcomponents thereof that are similar as between the right and left sides of the folding wheel rake 10 are for convenience annotated with like numerals in the drawings.

Left wheel rake assembly spring mount 50 (depicted in FIG. 5) and right wheel rake assembly spring mount 40 (see FIG. 1) are carried by the base 56 of right and left wheel rake assembly retainers 38, 48, respectively. The spring mounts 50, 40 each include (see FIG. 1 and FIG. 5) a helical compression spring 58, and a spring cap 60, secured on top of the compression spring 58. Spring cap 60 further presents a threaded bore 62 centrally located therein. Adjustment screw 63 is threaded into threaded bore 62. Spring cap 60 is secured to the top of spring 58 by a plurality of bent tabs 64, bolts (not shown), or other suitable fastener and includes a recess 65 sufficiently large to receive the head 66 of adjustment screw 63. The bottom of springs 58 are permanently welded to the base 56 of respective right and left wheel rake assembly retainers 38, 48.

Referring to FIGS. 1, 3 and 6, right wheel rake assembly 14 generally includes right arm assembly 70, right beam assembly 72, and right adjustment rod mechanism 74. Right arm assembly 70 is pivotably secured to transverse bar 22 by pivot pin 76 at right wheel rake assembly pivot mount 42.

Right arm assembly 70 includes sleeve 77 and slider 78. Slider 78 fits slidably within sleeve 77 in a telescoping fashion.

Figure 7:
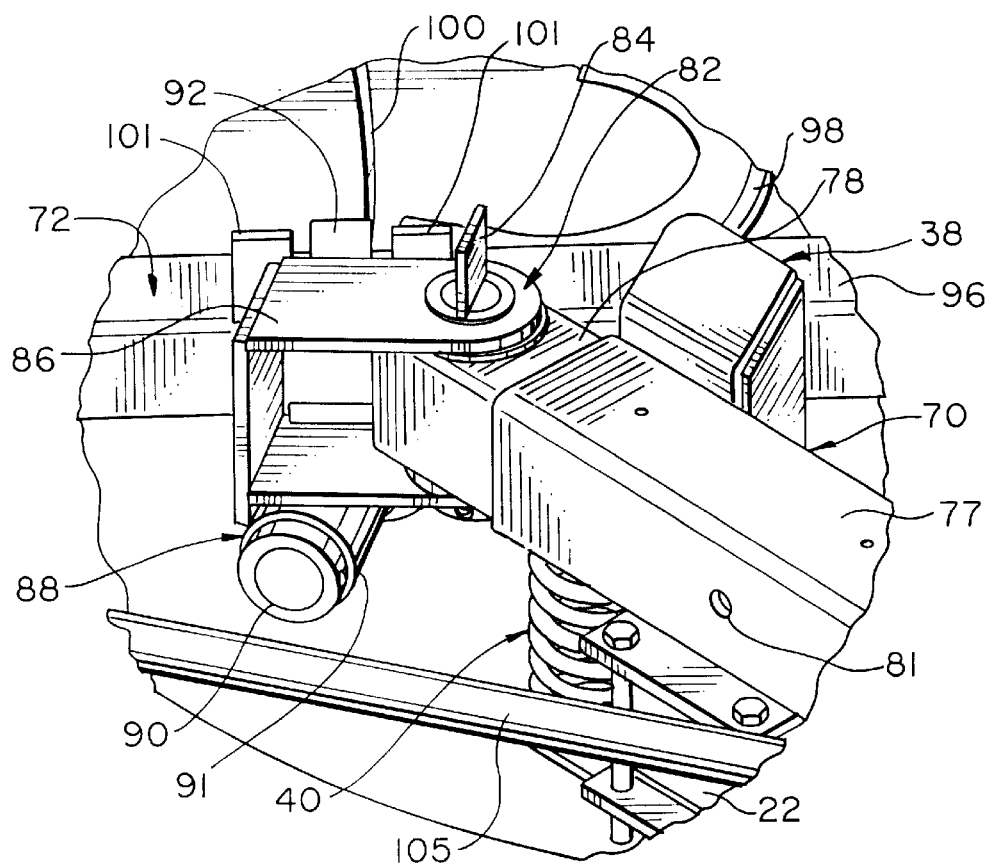
FIG. 7 depicts detail of area E from FIG. 1.

FIG. 7 depicts particular details of right wheel rake assembly 14. As previously noted, right slider 78 fits slidably within right sleeve 77 in a telescoping fashion. Slider 78 presents slider lock pin holes (not shown) which are alignable with sleeve lock pin holes 81 to receive a lock pin (not shown) therethrough.

The distal end of slider 78 further includes beam angle pivot assembly 82, pivotably supporting right beam assembly 72 about a vertical axis on pivot pin 84. Beam angle pivot assembly 82 includes beam angle pivot clevis 86. Beam angle pivot clevis 86 supports beam wobble pivot assembly 88, including shaft 90 and shaft receiving sleeve 91, and beam assembly stop 92.

Beam assembly 72 includes beam 96, rake wheel supports 98, and rake wheels 100. Stops 101 are carried on beam 96, and straddle stop 92. Shaft 90 of beam wobble pivot assembly 88 is fixedly carried by beam 96, and is rotatably received within sleeve 91 for pivotal support of the beam assembly 72 by the arm assembly 70.

Figure 8:
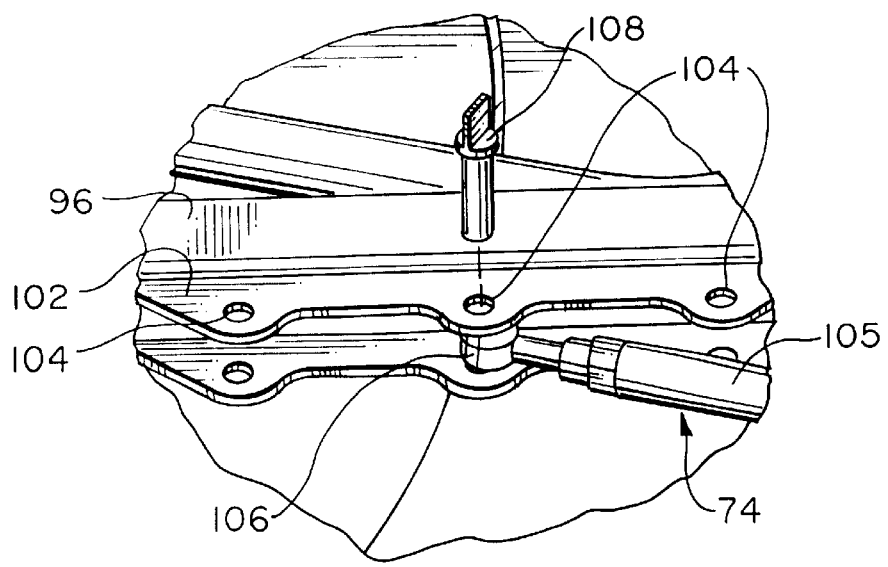
FIG. 8 depicts detail of area F from FIG. 1.

Referring to FIG. 8, the adjustment rod mechanism 74 comprises adjustable threaded rod 105 extending between multi-point adjustment clevis 102 secured to beam 96, and adjustment rod attachment 103 carried on the front face of sleeve 77 (see FIG. 3). Clevis 102 presents a plurality of angle adjustment apertures 104 each adapted for receiving distal eye 106 of adjustment rod 105. Distal eye 106 can be secured by angle adjustment lock pin 108. Referring to FIGS. 3 and 6, proximal eye 110 of adjustment rod 76 is pivotably, removably secured to adjustment rod attachment 82 by pin 112.

Left wheel rake assembly 16 is generally similar to right wheel rake assembly 14, principally being a mirror image of the right side, and subcomponents thereof that are similar as between the right and left sides of the folding wheel rake 10 are for convenience annotated with like numerals in the drawings.

The lift assembly 18 generally includes a hydraulic piston and cylinder assembly 114, a bellcrank assembly 116, a pushrod 118 and a crank assembly 120.

The hydraulic piston and cylinder assembly 114 includes a piston rod 122 presenting attachment end 124 and a cylinder 126 having attachment end 128 received by pivot mount 44.

Bellcrank assembly 116 includes piston rod receiving tower 130 and crank arm 132. Piston rod receiving tower 130 is fixedly secured on top of sleeve 77 of right wheel rake assembly 14. Piston tower 130 presents flotation slot 134, the long axis of which is generally parallel to the long axis of sleeve 77. Crank arm 132 is fixedly secured to sleeve 77 of right wheel rake assembly 14 and rotates about pivot pin 76 received by right wheel rake assembly pivot mount 42. Crank arm 132 includes locking aperture 136 alignable with a right lock aperture (not shown) in pivot mount 42 when right wheel rake assembly 14 is in the vertical position. Lock pin 138 is receivable through locking aperture 136 and the locking aperture in pivot mount 42. Crank arm 132 is pivotably coupled to pushrod 118 by pin 140. Pushrod 118 includes angled stub 142 and a tower link collar 144 at opposite ends.

Crank assembly 120 includes pushrod tower 150 and angled lock brace 152. Pushrod tower 150 is fixedly secured on top of sleeve 77 of left wheel rake assembly 16. Push rod tower 150 presents push rod tower flotation slots 154, the long axes of which are generally parallel to the long axis of sleeve 77. Brace 152 is pivotably mounted at left wheel rake assembly pivot mount 46 and is fixedly attached to sleeve 77 of left wheel rake assembly 16. Brace 152 includes locking aperture 156 adapted to receive lock pin 158 therethrough. Locking aperture 156 aligns with a locking aperture (not shown) on left wheel rake assembly pivot mount 46 when the folding wheel rake 10 is in the folded position.

The hydraulic piston and cylinder assembly 114 is secured at cylinder attachment end 128 to the hydraulic piston and cylinder assembly pivot mount 44 on transverse bar 22, rotating about pin 146. Rod attachment end 124 is secured slidably and rotatably within piston tower flotation slots 134 by slot engagement pin 148. Angled stub 142 is rotatably secured to crank arm 132 by pin 140. Tower link collar 144 slidably and rotatably secures pushrod 118 to pushrod tower 150 at pushrod flotation slot 154 by link pin 155.

In operation, the wheel rake 10 is towed through the fields to rake forage by a tractor or other prime mover. The general operation of wheel rakes is well known in agriculture and will be apparent to one skilled in the art. Transport of the rake from one field to another is generally accomplished by raising the wheel rake assemblies 14 and 16 to the transport position by application of hydraulic pressure from the tractor's hydraulic system. This provides clearance to pass through gates and down narrow paths as well as preventing damage to rake wheels 100 when in transit.

While normally pulled by a tractor, the folding wheel rake 10 may also be connected to another type of vehicle, such as a pickup truck, for transport.

With wheel rake assemblies 14, 16 in the raking position, slot engagement pin 148 is centered in flotation slots 134. This enables freedom of flotation of right wheel rake assembly 14 both upwardly and downwardly from its neutral position. Likewise, link pin 155 is centered in pushrod tower flotation slot 154 when left wheel rake assembly 16 is in the raking position enabling flotation in both directions.

When folding of wheel rake assemblies 14, 16 is desired, hydraulic pressure is applied to piston and cylinder assembly 114 retracting piston rod 122. Slot engagement pin 148 is drawn to the medial end of flotation slot 134. Force is then applied to right wheel rake assembly 14 rotating it upwardly and inwardly. As wheel rake assembly 14 rotates, attached crank arm 132 rotates downwardly and outwardly pulling pushrod 118 at angled stub 142. Force is transmitted to tower link collar 144 and link pin 155, drawing link pin 155 medially until it contacts the medial end of pushrod tower flotation slot 154. Left wheel rake assembly 16 is then rotated upwardly and inwardly until it reaches the upright transport position. Right and left pivot stops 52, 54 prevent wheel rake assemblies 14 and 16 from traveling beyond the transport position. Lock aperture 136 is then aligned with right lock aperture 137, and lock pin 138 may be inserted to secure the right wheel rake assembly 14 in the transport position. Likewise, locking aperture 156 is aligned with left lock aperture 160 and secured by a lock pin 158.

A reverse process enables unfolding of the folding wheel rake 10. Lock pins 138 and 158 are removed from apertures 136 and 156. Piston rod 122 is extended from hydraulic piston and cylinder assembly 114 pushing slot engagement pin 148 against flotation slot 134 causing wheel rake assembly 14 to rotate outwardly and downwardly. Integral crank arm 132 rotates so that pin 140 is rotated upwardly and inwardly carrying with it angled stub 142. Pushrod 118 forces link pin 155 laterally causing pushrod tower 150 to rotate outwardly and downwardly carrying with it left wheel rake assembly 16. Slot engagement pin 148 and link pin 155 are ultimately approximately centered in their respective flotation slot 134 and pushrod tower flotation slot 154.

Figure 9A:
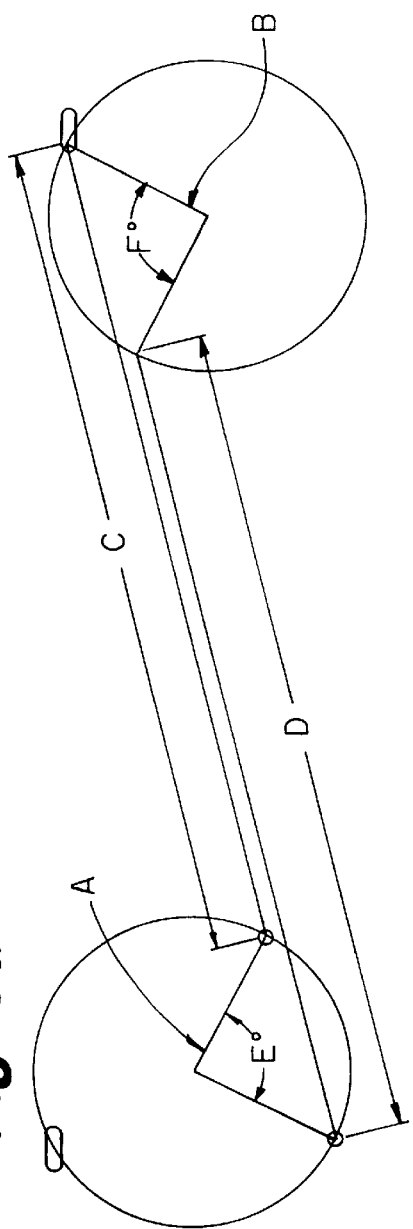
FIG. 9a is a schematic representation of the relationship of the lengths of the members of a four bar linkage that comprises the folding mechanism of the folding wheel rake in the folded and unfolded configurations showing the need for two different lengths of a pushrod to fold the rake.
Figure 9B:
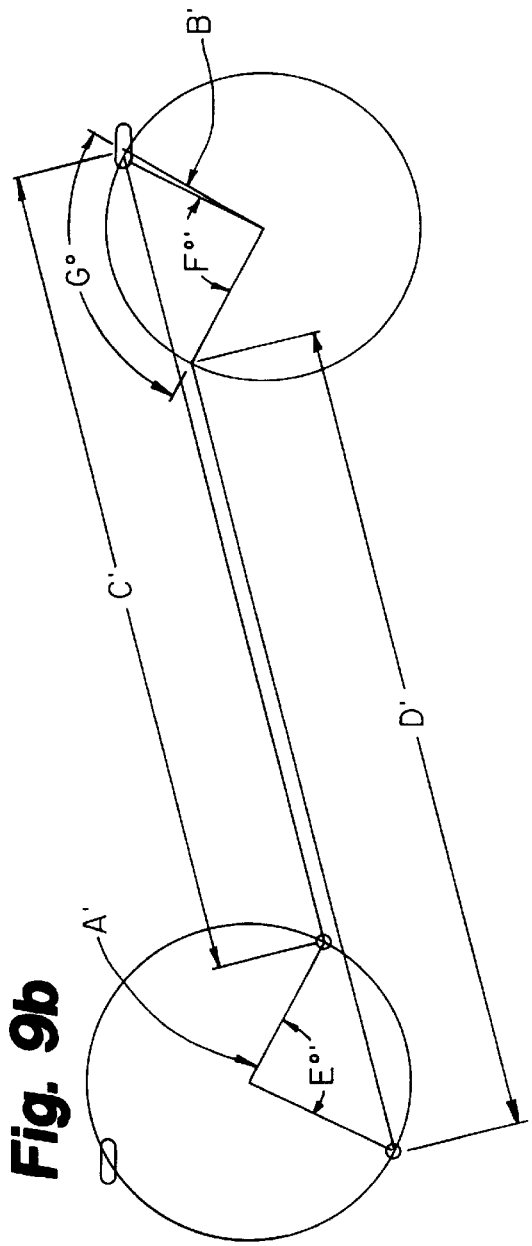
FIG. 9b is similar to 9a but shows how the folding mechanism of the folding wheel rake resolves this problem.

It is desirable that wheel rake assemblies 14, 16 achieve a symmetrical vertical orientation when folded. Referring to FIGS. 9a and 9b, the presence of flotation slot 134 and pushrod tower flotation slot 154 create free play that is desirable for flotation. However, the free play complicates achieving symmetrical folding. The radius of the arc traveled by pushrod post 140 has been adjusted to vary from the arc of tower link pin 155. Additionally, the portion of the arc transcribed by pushrod post 140 may vary from that of tower link pin 155. This arrangement allows pushrod post 140 to travel an arc of approximately 90 degrees while link pin 155 travels an arc of approximately 93 degrees achieving secure, symmetrical, compact, vertical folding as depicted in FIG. 4.

Another way of describing this arrangement is to consider the lift assembly 18 as a four bar linkage in which one of the linkage bars is of variable length. The variable length bar achieves its shortest length when under tension. The other three bars are of fixed length. The ground bar represents the distance between right wheel rake assembly pivot mount 42 and left wheel rake assembly pivot mount 46. The second bar represents the radius of the arc traveled by pushrod post 140. The third bar is defined by the radius of the arc traveled by link pin 155 about left wheel rake assembly pivot 46. The effective length of pushrod 118 forms the fourth bar. Effective length is the straight-line distance between pushrod post 140 and link pin 155. The effect of tower link pin 155 sliding in pushrod tower flotation slot 155 and of flotation slot 154 turning approximately 90 degrees during the folding process is to vary the effective length of pushrod 118.

If it is desired to rake with only one wheel rake assembly lowered, left wheel rake assembly 16 may be left in the transport position locked by pin 158. Link pin 155 may be removed from pushrod tower flotation slot 154 and right wheel rake assembly 14 may be lowered independently. To return to raking with both wheel rake assemblies simultaneously lowered pushrod 118 may be reconnected to pushrod tower rotation slot 154 by link pin 155.

With the folding wheel rake 10 in the unfolded, raking configuration as in FIGS. 1 and 7 the folding wheel rake 10 may be drawn by a prime mover, such as a tractor, by attachment of the hitch 24. The general use of wheel rakes for raking forage is well known in the art.

Referring to FIG. 7, the width of separation of the wheel rake assemblies 14, 16 may be adjusted by telescoping sliders 78 into or out of sleeves 77. Sliders 78 may be secured in any of a plurality of positions by inserting a pin (not shown) through a sleeve lock pin hole 81 and one of a plurality of slider lock pin holes (not shown). Other locking mechanisms may be used without departing from the spirit and scope of the invention.

Referring to FIG. 8, the angle of beam assemblies 72 may be adjusted relative to the direction of travel of the folding wheel rake 10 independently of width adjustment. Angle adjustment of the right wheel rake assembly 14 is achieved by aligning distal eye 106 of adjustment rod 75 with any of a plurality of angle adjustment positions 104 and inserting a pin 108 therethrough to achieve the desired angle.

Figure 5:
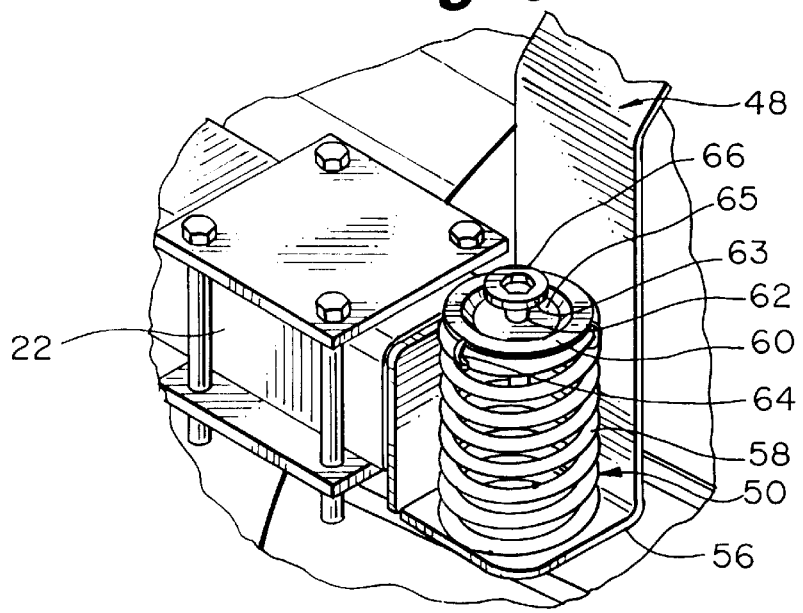
FIG. 5 depicts detail of area C from FIG. 4.

Raking down pressure may also be adjusted independently of other variables. Referring to FIGS. 4 and 5, rake wheel rake assemblies 14 and 16 are raised to provide access to adjustment screws 63. The adjustment screw 63 may then be turned into or out of spring cap 60 in order to increase or decrease the length to which it extends from spring 58. When rake wheel rake assemblies 14 and 16 are lowered to raking position, it will be understood that the spring 58 will be compressed to a greater degree as the screw 63 extends further from the spring 58.

To facilitate shipping and storage the folding wheel rake 10 may be folded to a very compact configuration. Sliders 78 are telescoped fully into sleeves 77. Wheel rake assemblies 14 and 16 are folded to the transport position. Angle adjustment rods 74 are released. Beam assemblies 72 are then rotated until generally parallel with arm assemblies 70. Angle adjustment rods 74 are likewise made generally parallel to arm assemblies 70

Referring to FIG. 9a, radius A represents the length of crank arm 132. Radius B is the length of crank assembly 120. Length C is the length of pushrod 118 needed with the wheel rake 10 in the unfolded position. Length D is the length of pushrod needed with the wheel rake 10 in the folded position. Angle E and angle F represent the arcs traveled by the right wheel rake assembly 14 and the right wheel rake assembly 16 respectively when moving from the unfolded position to the folded position.

If radius A is equal to radius B and tower link pin 155 starts at the center of tower flotation slot 154 then the transition form the unfolded position to the folded position will leave the left wheel rake assembly slightly short of a fully vertical position. This would required that length D be less than length C. It is unnecessarily complex for pushrod 118 to vary in length during the folding process.

Therefore (refer to FIG. 9a), it is beneficial for radius A to be larger than radius B so that the left wheel rake assembly 16 is pulled to a fully vertical position upon folding. When radius A' and radius B' are chosen appropriately it will be seen that length C' may be equal to length D' and that left wheel rake assembly 16 travel in arc F' while tower link pin 155 travels in arc G. This arrangement enables secure, compact, symmetrical folding of both right wheel rake assembly 14 and left wheel rake assembly 16 wheel still employing a simple linkage with few wear points.

The present invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

What is claimed is:

1. An agricultural implement, comprising:
a primary frame;
ground engaging wheels operably coupled to said primary frame;
first and second, opposed subframes, each subframe operably, pivotally coupled to said primary frame and selectively, pivotally shiftable between a lowered, generally horizontal working position and a raised, generally vertical transport position relative to said primary frame; and
a folding mechanism operably coupling said primary frame, first subframe and second subframe, including;
a selectively extensible assembly having a first end operably coupled to said primary frame and said first subframe for selectively, pivotally shifting said first subframe between said working position and said transport position; and
a connecting rod assembly having a connecting rod with a first end operably coupled to said first subframe and an opposed, second end operably coupled to said second subframe for simultaneous shifting of said second subframe, between said generally horizontal working position and said generally vertical transport position, with said first subframe.

2. The invention as claimed in claim 1, said extensible assembly being operably coupled to said first subframe, by a first loose connection assembly, whereby said first subframe is pivotally shiftable over a limited range relative to said primary frame when said first subframe is in said working position.

3. The agricultural implement of claim 2 wherein the extensible assembly is a single piston.

4. The invention as claimed in claim 2, said connecting rod assembly being operably coupled to said second subframe by a second loose connection assembly, whereby said second subframe is pivotally shiftable over a limited range relative to said primary frame when said second subframe is in said working position.

5. The invention as claimed in claim 4, said first subframe operably pivotable between said working and transport positions about a first subframe pivot axis, and said second subframe operably pivotable between said working and transport positions about a second subframe pivot axis, said connecting rod assembly having a connecting rod with a first end operably coupled to said first subframe at a first connecting rod pivot axis and second end operably coupled to said second connecting rod pivot axis, said first and second connecting rod axes oriented relative to said first and second subframe axes whereby said first and second subframes are generally fixedly, symmetrically oriented relative to said primary frame when said subframes are in said transport positions, not withstanding said first and second loose connection assemblies that provide for pivotal shifting of said first and second subframes relative to said primary frame when said first and second subframes are in said working positions.

6. The agricultural implement of claim 1 wherein the connecting rod assembly comprises a bellcrank.

7. The agricultural implement of claim 1 wherein the extensible assembly is a single piston.

8. An agricultural implement, comprising:
a primary frame;
ground engaging wheels operably coupled to said primary frame;
first and second, opposed subframes, each subframe operably, pivotally coupled to said primary frame and selectively, pivotally shiftable between a lowered working position and a raised transport position relative to said primary frame; and
a folding mechanism operably coupling said primary frame, first subframe and second subframe, including
a selectively, linearly extensible assembly operably extending between said primary frame and said first subframe for selectively, pivotally shifting said first subframe between said working position and said transport position; and
a connecting rod operably extending between said first subframe and said second subframe for simultaneous shifting of said second subframe, between said working position and said transport position, with said first subframe,
said extensible assembly being operably coupled to said first subframe, by a first loose connection assembly, whereby said first subframe is pivotally shiftable over a limited range relative to said primary frame when said first subframe is in said working position,
said connecting rod being operably coupled to said second subframe by a second loose connection assembly, whereby said second subframe is pivotally shiftable over a limited range relative to said primary frame when said second subframe is in said working position.

9. The invention as claimed in claim 8, said first subframe operably pivotable between said working and transport positions about a first subframe pivot axis, and said second subframe operably pivotable between said working and transport positions about a second subframe pivot axis, said connecting rod having a first end operably coupled to said first subframe at a first connecting rod pivot axis and second end operably coupled to said second connecting rod pivot axis, said first and second connecting rod axes oriented relative to said first and second subframe axes whereby said first and second subframes are generally fixedly, symmetrically oriented relative to said primary frame when said subframes are in said transport positions, not withstanding said first and second loose connection assemblies that provide for pivotal shifting of said first and second subframes relative to said primary frame when said first and second subframes are in said working positions.

10. An folding assembly for use with loose connection assemblies disposed on an agricultural implement that includes a primary frame; ground engaging wheels operably coupled to the primary frame; first and second opposed subframes, each subframe being operably pivotally coupled to the primary frame and selectively, pivotally shiftable between a lowered, generally horizontal working position and a raised, generally vertical transport position relative to said primary frame; the folding mechanism comprising:
the folding assembly including a selectively extensible assembly; a connecting rod; a first connection assembly; and a second connection assembly;
the selectively extensible assembly operably connected to the first subframe and the primary frame to pivotally shift the first subframe between the working and transport positions;
the connecting rod having a first end and a second end; the first end operably coupled to the first connection assembly and the second end operably coupled to the second connection assembly; with the first end describing a first arc and the second end describing a second arc relative to the primary frame as the subframes are moved between the working and transport positions;

the first connection assembly being attached to the first subframe and the second connection assembly being attached to the second subframe, and at least one of the first or second connection assemblies being a loose connection assembly;

with the first and second connection assemblies cooperating with the connecting rod so that the first arc and the second arc are not equal, whereby a folding assembly using loose connections may be used to position the two subframes in a generally horizontal working position and a raised, generally vertical transport position relative to said primary frame.

11. The folding assembly of claim 10 wherein the second connection assembly is a bell crank.

12. The folding assembly of claim 11 wherein the first connection assembly is a loose connection assembly and the first arc is greater than the second arc.

* * * * *